US012786085B2

(12) United States Patent
Srinivas et al.

(10) Patent No.: US 12,786,085 B2
(45) Date of Patent: Nov. 3, 2026

(54) SYSTEMS AND METHODS FOR NETWORK MONITORING OF A NETWORK USING SUPERVISED MACHINE LEARNING AND REINFORCEMENT LEARNING

(71) Applicant: Fortinet, Inc., Sunnyvale, CA (US)

(72) Inventors: Lavanya Lingaraju Srinivas, Bangalore Karnataka (IN); Siva Rama Krishna Rao Yogendra Jupudi, Bangalore Karnataka (IN)

(73) Assignee: FORTINET, INC., Sunnyvale, CA (US)

( * ) Notice: Subject to any disclaimer, the term of this patent is extended or adjusted under 35 U.S.C. 154(b) by 134 days.

(21) Appl. No.: 18/647,655

(22) Filed: Apr. 26, 2024

(65) Prior Publication Data

US 2025/0337668 A1 Oct. 30, 2025

(51) Int. Cl.
*G06F 15/16* (2006.01)
*H04L 41/16* (2022.01)
*H04L 43/08* (2022.01)

(52) U.S. Cl.
CPC .............. *H04L 43/08* (2013.01); *H04L 41/16* (2013.01)

(58) Field of Classification Search
None
See application file for complete search history.

(56) References Cited

U.S. PATENT DOCUMENTS 10,659,324 B2 * 5/2020 Pang ..................... H04L 9/0866
12,015,630 B1 * 6/2024 Cross .................. H04L 63/1433
2019/0114245 A1 * 4/2019 Mermoud ........... G06F 11/3466
2019/0245754 A1 * 8/2019 Greene, Jr. ............. H04L 41/16
2019/0312876 A1 * 10/2019 Kumaran .............. H04L 41/507
2023/0308901 A1 * 9/2023 De Andrade ......... H04W 24/08
2024/0267393 A1 * 8/2024 Thompson .......... H04L 63/1416
2025/0190623 A1 * 6/2025 Sreenidurai ............. H04L 63/04

OTHER PUBLICATIONS

Introducing FortiAIOPs 2.0 at Mobility Field Day 9, Jul. 7, 2023, downloaded from: https://wifivitae.com/2023/07/07/introducing-fortiaiops-2-0-at-mobility-field-day-9/, 10 pages.

* cited by examiner

*Primary Examiner* — Phuoc H Nguyen

(74) *Attorney, Agent, or Firm* — Jaffery Watson Hamilton & DeSanctis LLP

(57) ABSTRACT

A computer-implemented method includes identifying features including access point (AP) parameters and client device parameters that indicate a network health of a network of one or more access points (AP) and client devices, performing feature goodness classification (FGC) to classify each identified feature independently, computing cumulative scores periodically as a weighted sum of normalized values of each feature, determining if a network problem is identified based on the cumulative scores, and implementing a correlation model with supervised machine learning to determine correlation criteria and remediation actions based on features contributing to an identified network problem. The computer-implemented method may also implement a reinforcement learning (RL) based remediation model to rank intersection regions for correlation criteria based on rewards.

18 Claims, 9 Drawing Sheets

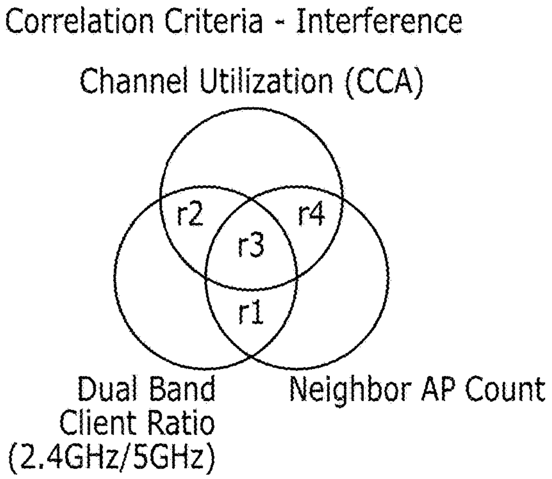

Remediation Matrix Based On Features Contributing To The Issue r4 Turn Off Radio On Neighbor APs APx, APy,...

r3 Enable Auto Channel Or Band Steering On Neighbor APs APm, APn,...

r2 Enable Band Steering On Current AP r1 Reduce Inactivity Timeout + Enable Band Steering On Neighbor APs APa, APb,...

FIG. 4A

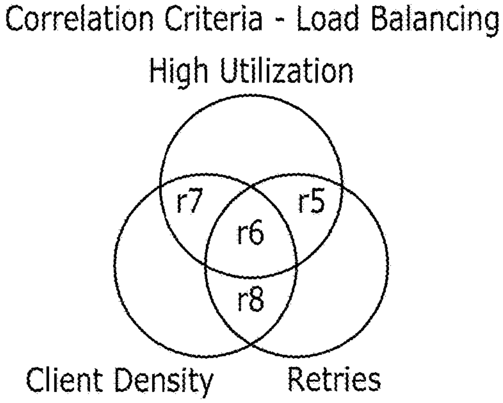

r5 Move Some APs To Different Frequency Band r6 Enable Band Steering On Current AP r7 Load Balance Across Neighbor APs APu, APv,...

r8 Prune Lower Data Rates

FIG. 4B

Correlation Criteria - RF Coverage

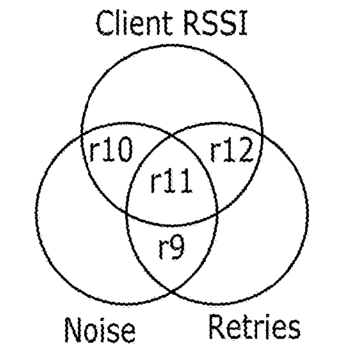

r12 Increase AP Tx Power If Not At Max Else Add AP If Neighbor AP Count Is Less Than Allowed Limit r11 Enable Sticky Client Removal r10 Move Current AP Or Enable 11k r9 Fix Interference - Correct Tx Power Of Neighbor APs APi, APj, Remove Non-Wifi Interference

FIG. 4C

Correlation Criteria - Anomalies On Wired n/w

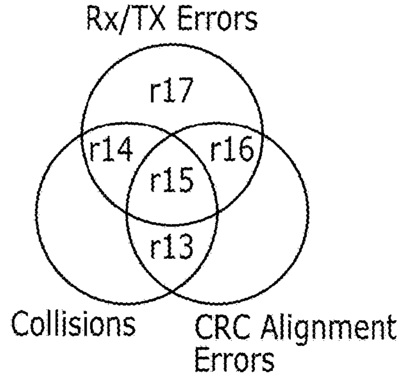

Remediation Matrix To Be Applied On Wired Network Nodes, Based On Features Contributing To The Issue r17 Fix Bad NIC r16 Check Cable Compatibility, Check If Faulty NIC...

r15 Switch To Full Duplex, Fix Bad NICs And Cable Compatibility r14 Switch To Full Duplex, Fix Bad NICs r13 Fix Defective Cable Issues, Switch To Full Duplex

FIG. 4D

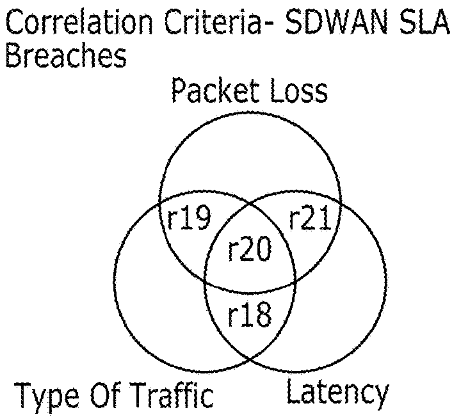

Remediation Matrix To Be Applied On SDWAN Network Nodes, Based On Features Contributing To The Issue r21 Update The Interface Selection Strategy To Consider An Interface With Lower Packet Loss And Latency r20 Enable Load Balancing And Prioritize Traffic Over An Interface Based On The Traffic Type r19 Enable Traffic Shaping,
Enable QoS Policies To Limit Bandwidth Usage For Video Traffic (Generally, Packet Loss Increases With Higher Bandwidth Usage)

r18 Enable Traffic Shaping,
Enable QoS Policies To Prioritize Voice Traffic And Block Video Traffic (High Latency Affects Voice Application experience More)

FIG. 4E

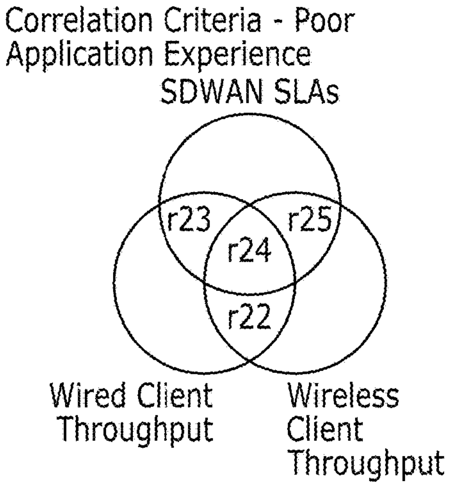

Remediation Matrix Based On Features Contributing To Issues Across Multiple Network Segments r25 Switch To Better SDWAN Interface If Wireless Client Data Rates Is Good (Or) Fix Wireless Network Issues For Low Data Rates And Switch To Better SDWAN Interface r24 Switch To Better SDWAN Interface If Both Wireless Data Rates And Wired Link Speed Is Good (Or) Fix Wireless And/Wired Network Issues For Poor Data Rates And Link Speed And Switch To Better SDWAN Interface r23 Switch To Better SDWAN Interface If Wired Link Speed Is Good (Or) Fix Link Speed Issues Affecting Wired Network Throughput And Switch To Better SDWAN Interface r22 Fix Link Speed Issues Affecting The Wired Network Throughput,
Fix Wireless Network Issues For Low Data Rates

FIG. 4F

SYSTEMS AND METHODS FOR NETWORK MONITORING OF A NETWORK USING SUPERVISED MACHINE LEARNING AND REINFORCEMENT LEARNING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2024, Fortinet, Inc.

FIELD

Embodiments discussed generally relate to systems and methods for network monitoring of a network using supervised machine learning and reinforcement learning.

BACKGROUND

Health management of a wireless network (e.g., Wi-Fi network) typically involves monitoring of some of the parameters that are reflective of network health for network service level agreements (SLAs) and notifying an administrator (e.g., by raising alerts/alarms) when individual parameter values are not within a permissible range. This conventional approach cannot provide useful insight into a cause of the issues affecting the network. In addition, in a Wi-Fi network, often several factors affect a problem and therefore it is not possible to predict a cause just based on the outcome of monitoring of each of the parameters independently. Further, there can be a commonality of factors affecting different issues and hence it will be difficult to accurately predict an underlying network cause based on individual parameters alone. Further, the scale of the network adds to the complexity of identifying a cause of network issues.

SUMMARY

Various embodiments provide systems and methods for network monitoring of a network using supervised machine learning and reinforcement learning. A computer-implemented method includes identifying features including access point (AP) parameters and client device parameters that indicate a network health of a network of one or more access points (AP) and client devices, performing feature goodness classification (FGC) for the identified features, computing cumulative scores periodically as a weighted sum of normalized values of each feature, determining if a network problem is identified based on the cumulative scores, and implementing a correlation model with supervised machine learning to determine correlation criteria and remediation actions based on features contributing to an identified network problem.

In some embodiments, a system includes a processing resource and a non-transitory computer readable medium coupled to the processing resource and having stored therein instructions that when executed by the processing resource cause the processing resource to identify features including access point (AP) parameters and client device parameters that indicate a network health of a network of one or more access points (AP) and client devices, perform feature goodness classification (FGC) for the identified features, compute cumulative scores periodically as a weighted sum of normalized values of each feature, determine if a network problem is identified based on the cumulative scores, and implement a correlation model with supervised machine learning to determine correlation criteria and remediation actions based on features contributing to an identified network problem.

In some embodiments, a non-transitory computer readable medium having stored therein instructions that when executed by the processing resource cause the processing resource to implement a correlation model with supervised machine learning to determine correlation criteria and remediation actions based on features contributing to an identified network problem of a network having one or more access points and client devices, receive with a reinforcement learning (RL) based remediation model correlation criteria and remediation actions, and rank intersection regions for correlation criteria based on rewards.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

FIGS. 4A-4F provide some examples of a sample correlation criteria and remediation matrix based on features contributing to a network issue in accordance with some embodiments;

DETAILED DESCRIPTION

Figure 1:
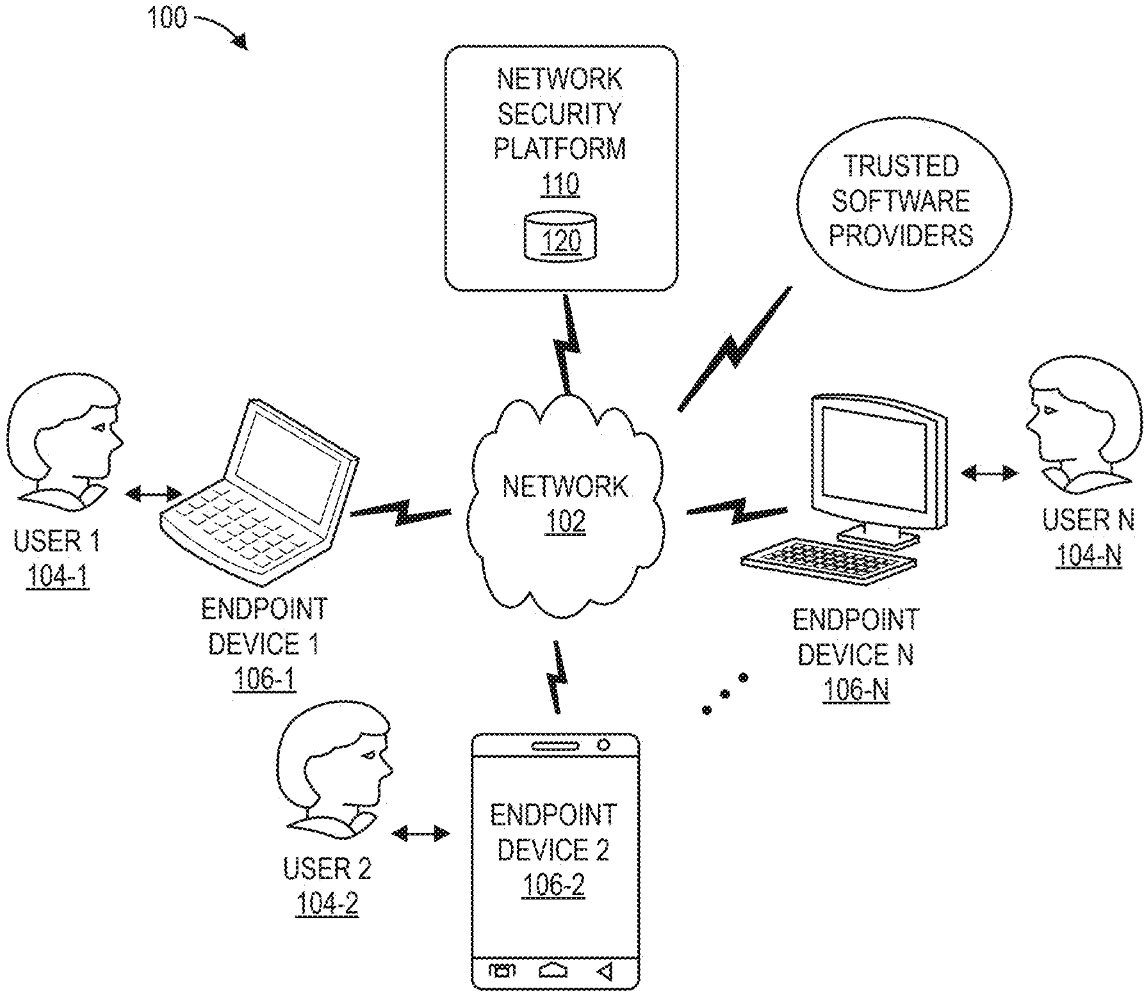
FIG. 1 illustrates a network architecture 100 in which aspects can be implemented in accordance with one embodiment.

Various embodiments provide systems and methods for network monitoring of networks using supervised machine learning and reinforcement learning. Novel features of the present design allow monitoring the network health (e.g., service level agreements (SLAs)) for multiple network criteria like performance, reliability, connectivity, etc. over time. A network appliance records and analyses several network parameters over time to automatically identify a problem, determines a root cause, and then applies or suggests remediation.

A network problem gets complex with highly scaled networks and usually requires manual interpretation of the statistics to determine the actual problem. The present design provides a supervised machine learning (ML) based model that can assist in determining a correlation across different network parameters to gain valuable insight into network health by leveraging the statistics data available from a network. This present design also provides automation of remediation based on reinforcement learning to achieve optimal remediation results.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrases "endpoint protection platform" or "endpoint security solution" generally refer to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and may leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the Software as a Service (SaaS) enSilo Endpoint Security Platform and the FORTICLIENT integrated endpoint protection platform available from Fortinet, Inc. of Sunnyvale, Calif.

The term "event" generally refers to an action or behavior of a process, for example, running on an endpoint device. Non-limiting examples of events include file system events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a key logging), an attempt capture a screen shot, an attempt to record sounds, and/or other behaviors or actions that may be similar to processes or programs known to be malicious.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. Such network security devices may include, but are not limited to, network firewall devices and/or network gateway devices. While there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances, FortiAIOps network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "network security platform" generally refers to one or more security event detection and/or classification sources that are used to protect a private network. The security event detection and/or classification sources of a network security platform may have knowledge of each other, communicate with each other, cooperate with each other to facilitate classification of observed security events and otherwise create synergies and improve the overall protection provided to the private network against cybersecurity threats. Alternatively or additionally, the security event classification sources participating within a network security platform may be under common control of a management service or device. A network security platform may include security event classification sources from the same or different parties (e.g., manufacturers and/or service providers) and the participating security event classification sources may reside or operate within different computing environments. For example, some of the participating security event classification sources may be implemented in physical form as part of an on premises solution and others may be implemented as services or in virtual form within a cloud-based environment (e.g., a cloud-based security service (e.g., the enSilo Cloud Service or FORTIGUARD security services available from Fortinet, Inc.) or within a third-party cloud provider). Non-limiting examples of a network security platform include one or more network security devices, network appliances, and/or endpoint protection platforms that are part of a cooperative security fabric (e.g., the Fortinet Security Fabric) and one or more network security services implemented within a cloud-based security service or other public, private or hybrid cloud environment. While in the context of various examples described herein, for sake of simplicity and brevity, a network security platform is described as including an endpoint protection platform running on an endpoint device of a private network, those skilled in the art will appreciate embodiments of the present disclosure are applicable to network security platforms including and a sandbox service and/or different security event detection/classification sources.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

FIG. 1 illustrates a network architecture 100 in which aspects can be implemented in accordance with one embodiment. In the context of network architecture 100, a network security platform 110, protecting a private network 102 is accessible to endpoint devices 106-1, 106-2, . . . , 106-N of private network 102. Network security platform 110 may include a cloud-based security service in which a sandbox service resides as well as an endpoint security solution running on the endpoint devices 106. The cloud-based security service may be implemented within a public cloud, a private cloud or a hybrid cloud. Non-limiting examples of a cloud-based security service include the FortiAIOps, enSilo Cloud Service, and FORTIGUARD security services available from Fortinet Inc.

The endpoint devices 106-1, 106-2, . . . 106-N (which may be collectively referred to as endpoint devices 106, and may be individually referred to as endpoint device 106 or endpoint device 106 herein) associated with network 102 may include, but are not limited to, personal computers, smart devices, web-enabled devices, hand-held devices, laptops, mobile devices, and the like. In one embodiment, network security platform 110 may interact with users 104-1, 104-2 . . . 104-N (which may be collectively referred to as users 104, and may be individually referred to as a user 104 herein) through network 102 via their respective endpoint devices 106, for example, in the form of notifications or alerts regarding security events via a user interface associated with the endpoint security solution.

Those skilled in the art will appreciate that, network 102 can be a wireless network, a wired network or a combination thereof that can be implemented as one of the various types of networks, such as an Intranet, a Local Area Network (LAN), a Wide Area Network (WAN), an Internet, and the like. Further, network 102 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Those skilled in the art will appreciate that embodiments of the present design involve integration of multiple actions performed within network security platform 110, which may include actions within the cloud alone, the endpoint security solution alone or a combination of both.

Figure 2:
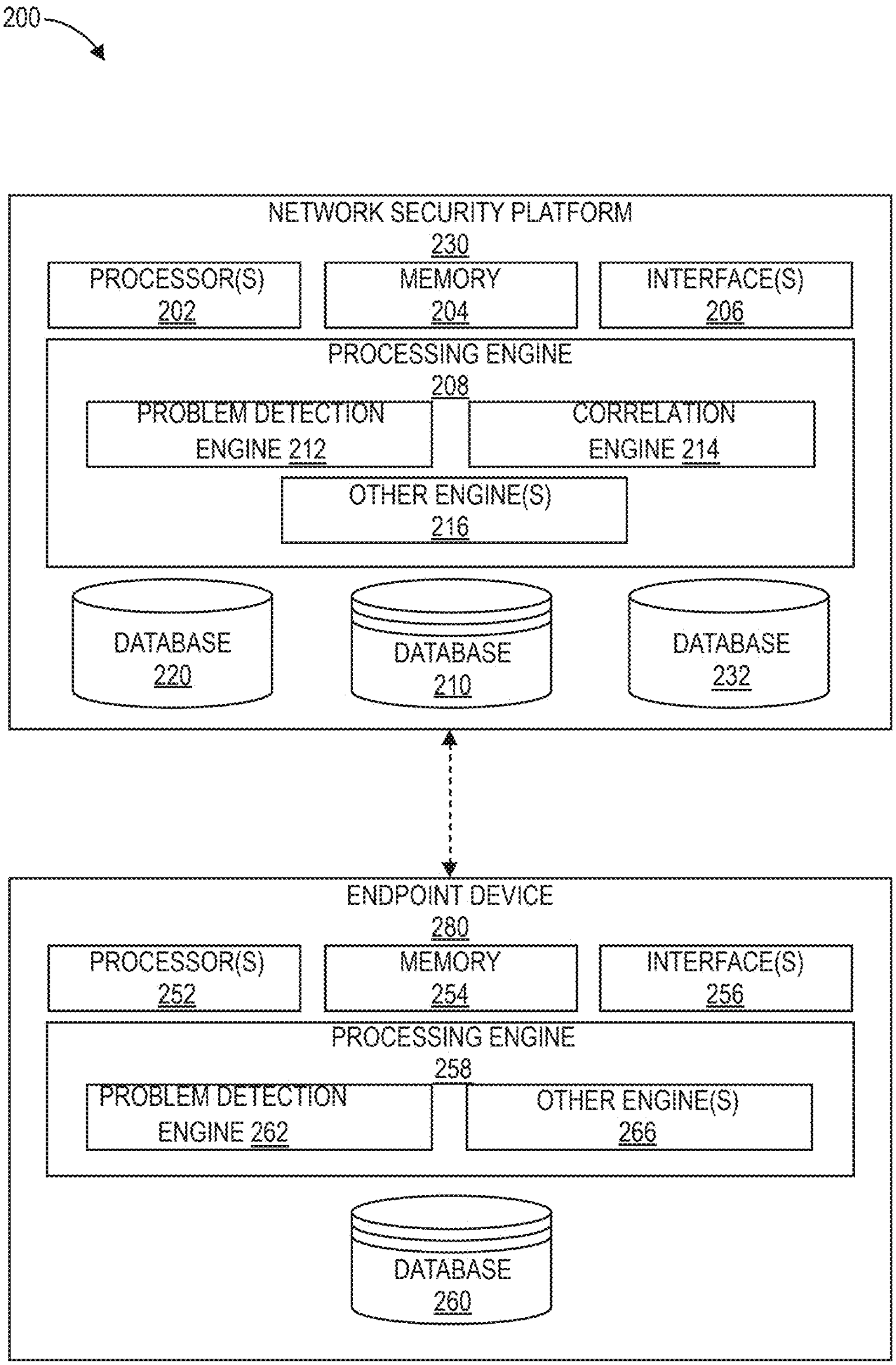
FIG. 2 is a block diagram 200 illustrating functional components of a network security platform 230 and an endpoint device 280 in accordance with one embodiment.

FIG. 2 is a block diagram 200 illustrating functional components of a network security platform 230 and an endpoint device 280 in accordance with one embodiment. In the context of the present example, network security platform 230 and endpoint device 280, can include one or more processor(s) 202 and 252 respectively. Processor(s) 202 and 252 can be implemented as one or more microprocessors, microcomputers, microcontrollers, digital signal processors, central processing units, logic circuitries, and/or any devices that manipulate data based on operational instructions. Among other capabilities, processor(s) 202 and 252 are configured to fetch and execute computer-readable instructions stored in a memory 204 and 254 respectively. Memory 204 and 254 can store one or more computer-readable instructions or routines, which may be fetched and executed to create or share the data units over a network service. Memory 204 and 254 can include any non-transitory storage device including, for example, volatile memory such as RAM, or non-volatile memory such as EPROM, flash memory, and the like. In an example embodiment, memory 204 and 254 may be a local memory or may be located remotely, such as a server, a file server, a data server, and the Cloud.

Network security platform 230 and endpoint device 280 can also include one or more interface(s) 206 and 256 respectively. Interface(s) 206 and 256 may include a variety of interfaces, for example, interfaces for data input and output devices, referred to as I/O devices, storage devices, and the like to facilitate communication with various devices and functional components.

Processing engine(s) 208 and 258 can be implemented as a combination of hardware and software or firmware programming (for example, programmable instructions) to implement one or more functionalities of processing engine(s) 208 and 258 of methods described herein. In the examples described herein, such combinations of hardware and software or firmware programming may be implemented in several different ways. For example, the programming for processing engine(s) 208 and 258 may be processor executable instructions stored on a non-transitory machine-readable storage medium and the hardware for processing engine(s) 208 and 258 may include a processing resource (for example, one or more processors), to execute such instructions. In the examples, the machine-readable storage medium may store instructions that, when executed by the processing resource, implement processing engine(s) 208 and 258. In such examples, network security platform 230 and endpoint device 280 can include the machine-readable storage medium storing the instructions and the processing resource to execute the instructions, or the machine-readable storage medium may be separate but accessible to network security platform 230, endpoint device 280 and the processing resource. In other examples, processing engine(s) 208 and 258 may be implemented by electronic circuitry. Databases 210, 220, 232, and 260 can include data that is either stored or generated as a result of functionalities implemented by any of the components of processing engine(s) 208 and 258 respectively.

In an example, processing engine 208 can include a problem detection engine 212, a correlation engine 214, and other engine(s) 216 (e.g., RL based remediation engine). Other engine(s) 216 can implement functionalities that supplement applications or functions performed by network security platform 230 or processing engine(s) 208.

In an example, processing engine(s) 258 can optionally include a problem detection engine 262, and other engine(s) 266 (e.g., correlation engine, RL based remediation engine). Other engine(s) 266 can implement functionalities that supplement applications or functions performed by endpoint device 280 or processing engine 258.

The database 232 can include file information such as size, publish date, risk score, vendor, brief software description, different hashes, and could be categorized in different categories and sub-categories. File versioning would also be possible to track file updates in an universal way commonly shared to the public.

Figure 3:
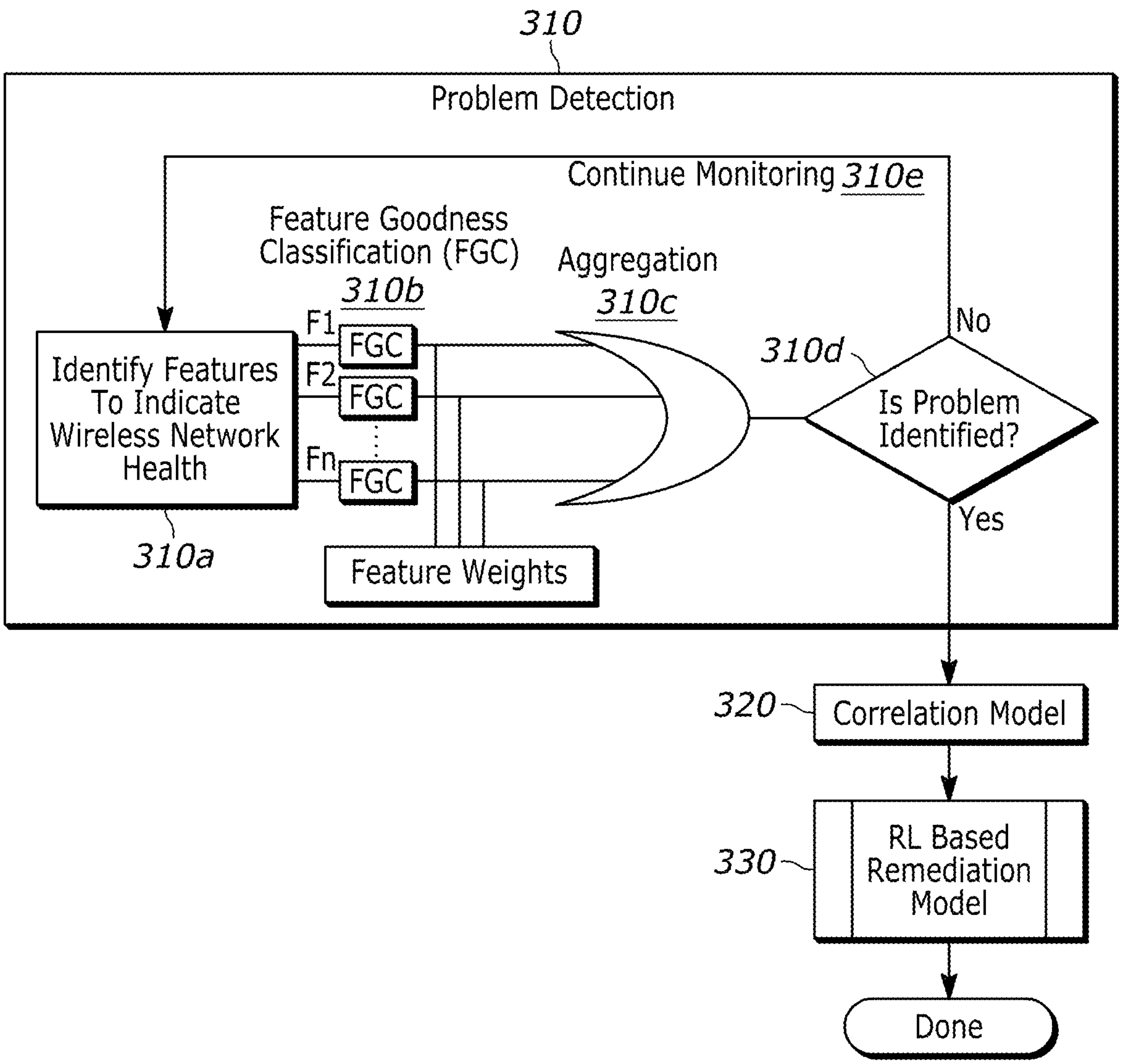
FIG. 3 illustrates operations of a computer implemented method for monitoring network health with a network security platform in accordance with one embodiment.

FIG. 3 illustrates operations of a computer implemented method for monitoring network health with a network security platform in accordance with one embodiment. The operations of the method 300 can be performed by a processing resource of a network security platform, a network security appliance/device including a network gateway, a VPN appliance/gateway, a network device, or UTM appliance (e.g., the FORTIGATE family of network security appliances, FortiAIOps network security appliances).

FortiAIOps enables a user to view and monitor the status of an entire wireless, wired, and SD-WAN network and provides insights into key health statistics, based on an Artificial Intelligence (AI) and Machine Learning (ML) architecture. FortiAIOps learns from network data to report statistics on a series of comprehensive and simple dashboards, providing visibility and deep insight into the network being monitored. FortiAIOps monitors integrated wireless, wired, and SD-WAN networks by supporting the monitoring of FortiGate controllers. The centralized real-time data and event logs offered by FortiAIOps, aim at diagnosing and troubleshooting network issues by analyzing potential problems and suggesting remedial steps.

At operation 310, the computer-implemented method includes initiating a problem detection stage. At sub-operation 310*a*, for the problem detection stage, the computer-implemented method includes identifying features (e.g., AP parameters, client device parameters) that indicate a wireless network health at an access point (AP) and client side. In one example, for the problem detection stage, the method selects one or more high level network parameters including AP parameters (e.g., channel utilization, transmit retries if AP does not receive acknowledgement of a transmitted data frame, data frame/packet discards, noise level, CPU stats) and client device parameters (e.g., RSSI, retries, discards, noise level). A data frame/packet discard occurs when a received frame/packet has a transmission or format error, or when the receiving device does not have enough storage room for the received frame/packets.

At sub-operation 310*b*, for the problem detection stage, the computer-implemented method includes performing feature goodness classification (FGC) for the identified features. The FGC will define thresholds for each of the identified features, and propose a supervised ML model to classify each of the features independently (e.g., good(0), fair(1), poor(2), or similar) with feature weights. For selective features like noise floor, the computer-implemented method will define higher weightage (e.g., multipliers), based on the criticality of the parameter, so that their impact stands out in the overall score. Then, the computer-implemented method at aggregation sub-operation 310*c* will compute a cumulative score as a weighted sum of normalized values of each feature.

The cumulative score is increased as the number of failing features increases. The computer-implemented method will compute the scores periodically as per a monitor interval and the values are input to a moving exponential average model or similar for problem identification at sub-operation 310*d*.

If the calculated score exceeds a benchmark (e.g., target score) consistently for a fixed number of intervals, then, with high probability, indeed a problem(s) exists in the network as shown by the Yes path below sub-operation 310*d*. If the calculated score is less than or equal to a benchmark (e.g., target score), then no problem(s) likely exist in the network as shown by a No path from 310*d* to continue monitoring sub-operation 310*e*, which returns to sub-operation 310*a*.

For the Yes path with high probability of a problem(s) existing in the network, the computer-implemented method implements a correlation model to determine correlation criteria and remediation actions based on features contributing to the identified network problem at operation 320. The computer-implemented method then implements a RL based remediation model at operation 330 and completes. Correlation is performed based on exploiting implicit relationships between various network parameters. The computer-implemented method uses additional network information, (e.g., client device density, dual band client device ratio, etc.) along with network parameters defined in Problem Detection, to identify a cause of the network problem(s). FIGS. 4A-4F illusrates sample correlation criteria to identify the cause and remediation matrices to list a few scenarios to demonstrate the cause using the correlation of network parameters with network information.

A supervised ML model is developed for correlation to identify the cause of the network problem(s) and possible remediation, from network parameters and network information. The supervised ML model predicts the root cause for a breach in network health (e.g., service level agreements (SLAs)), and determines a suitable remediation action. Correcting the network based on a most significant prevailing cause of the network problem(s) obtains far better results than choosing some likely cause at random.

For example, if "interference" as illustrated in FIG. 4A is the issue to be addressed and if a poor channel utilization issue co-exists along with high neighbor counts for the same channel, then an action would be specific to this issue. For example, recommended actions could include changing channels on neighbor access points and adjusting transmit (Tx) power, depending on which of these conditions are prevailing in the network. The stage of ML processing mentioned earlier in this section will help determine the actual factors affecting the issue and hence help identify the most relevant action.

As part of this operation, a "Remediation Matrix" for each correlation criteria (e.g., interference, load balancing, RF coverage, anomalies on a wired network, SDWAN SLA breaches, poor application experience) as illustrated in FIGS. 4A-4F is generated. Each Remediation Matrix provides a mapping of an underlying cause for a predicted issue to a respective remediation action. In some cases, or for certain correlation criteria, this could be just a static mapping defined based on domain information. FIGS. 4A-4F provide some examples of a sample correlation criteria and remediation matrix based on features contributing to a network issue. FIG. 4A illustrates potential interference in overlapping regions. An overlapping region r1 between dual band client ratio and neighbor AP count, can be resolved or mitigated with a remediation action of reducing inactivity timeout+enable band steering on neighbor Aps Aps, APb, . . . Band steering automatically assigns all Wi-Fi clients to their optimal wireless network. Band steering takes into account the technical characteristics of the respective client end device as well as its distance from a nearest access point. This results in data being transmitted more efficiently via band steering. A dual band client device can communicate with multiple wireless bands (e.g., 2.4 GHZ, 5 GHz).

For overlapping region r2 between dual band client ratio and channel utilization, this interference issue can be resolved or mitigated based on a remediation action to enable band steering on a current AP. For overlapping region r3, this interference issue can be resolved or mitigated based on a remediation action to enable auto channel or band steering on neighbor Aps Apm, APn, . . . . For overlapping region r4, this interference issue can be resolved or mitigated based on a remediation action to turn off a radio on neighbor APs Apx, APy, . . . .

FIG. 4B illustrates potential load balancing issues in overlapping regions. An overlapping region r5 between high utilization and retries, can be resolved or mitigated with a remediation action of moving some access points to a different frequency band. For overlapping region r6, this load balancing issue can be resolved or mitigated based on a remediation action to enable band steering on a current AP. For overlapping region r7, this load balancing issue can be resolved or mitigated based on a remediation action to load balance across neighbor access points APu, APv, . . . . For overlapping region r8, this load balancing issue can be resolved or mitigated based on a remediation action to prune connections with lower data rates.

FIG. 4C illustrates potential RF coverage issues in overlapping regions. An overlapping region r9 between noise and retries, can be resolved or mitigated with a remediation action of fixing interference by correcting transmit power of neighbor access points Api, APj, and remove non-wifi interference. For overlapping region r10, this RF coverage issue can be resolved or mitigated based on a remediation action to move a current AP or enable 11k WiFi, which has an ability to learn about a wireless environment. For overlapping region r11, this RF coverage issue can be resolved or mitigated based on a remediation action to enable sticky client removal. A sticky client device remembers a far away access point having a lower strength of signal. The sticky client removal removes the client device from the far away access point. For overlapping region r12, this RF coverage issue can be resolved or mitigated based on a remediation action to increase access point transmit power if not at maximum power or else add an access point if a neighbor access point count is less than an allowed limit.

FIG. 4D illustrates potential anomalies for a wired network in overlapping regions. An overlapping region r13 between collisions and CRC alignment errors, can be resolved or mitigated with a remediation action of fixing defective cable issues and switching full duplex communications. For overlapping region r14, these anomalies can be resolved or mitigated based on a remediation action of switching to full duplex communications and fixing any bad network interface cards. For overlapping region r15, these anomalies can be resolved or mitigated based on a remediation action of switching to full duplex communications, and fixing any bad network interface cards and cable compatibility. For overlapping region r16, these anomalies can be resolved or mitigated based on a remediation action to check cable compatibility and check if any faulty network interface cards. For overlapping region r17, these anomalies can be resolved or mitigated based on a remediation action to fix any bad network interface cards.

FIG. 4E illustrates potential SDWAN service level agreement (SLA) issues in overlapping regions. An overlapping region r18 between type of traffic and latency, can be resolved or mitigated with a remediation action of enabling traffic shaping, enabling quality of service (QoS) policies to prioritize voice traffic and block video traffic. A high latency affects voice application experience more other types of traffic. For overlapping region r19, the SDWAN service level agreement (SLA) issues can be resolved or mitigated based on a remediation action enable traffic shaping, enable QoS policies to limit bandwidth usage for video traffic. Generally, packet loss increases with higher bandwidth usage. For overlapping region r20, the SDWAN service level agreement (SLA) issues can be resolved or mitigated based on a remediation action to enable load balancing and prioritize traffic over an interface based on a traffic type. For overlapping region r21, the SDWAN service level agreement (SLA) issues can be resolved or mitigated based on a remediation action to update an interface selection strategy to consider an interface with lower packet loss and latency.

FIG. 4F illustrates a low quality application experience issue in overlapping regions. An overlapping region r22 between wired client throughput and wireless client throughput, can be resolved or mitigated with a remediation action of fixing link speed issues affecting the wired network throughput and fixing wireless network issues for low data rates. For overlapping region r23, this low quality application experience issue can be resolved or mitigated based on a remediation action of switching to better SDWAN interface if a wire link speed is good or fixing link speed issues affecting the wired network throughput and switch to better SDWAN interface. For overlapping region r24, this low quality application experience issue can be resolved or mitigated based on a remediation action to switch to a better SDWAN interface if both wireless data rates and a wired link speed is good or fixing wireless and or wired network interface issues for low data rates and link speed and switch to better SDWAN interface. For overlapping region r25, this low quality application experience issue can be resolved or mitigated based on a remediation action to switch to a better SDWAN interface if wireless client data rates are good or fixing wireless network issues for low data rates and switch to better SDWAN interface.

Figure 5:
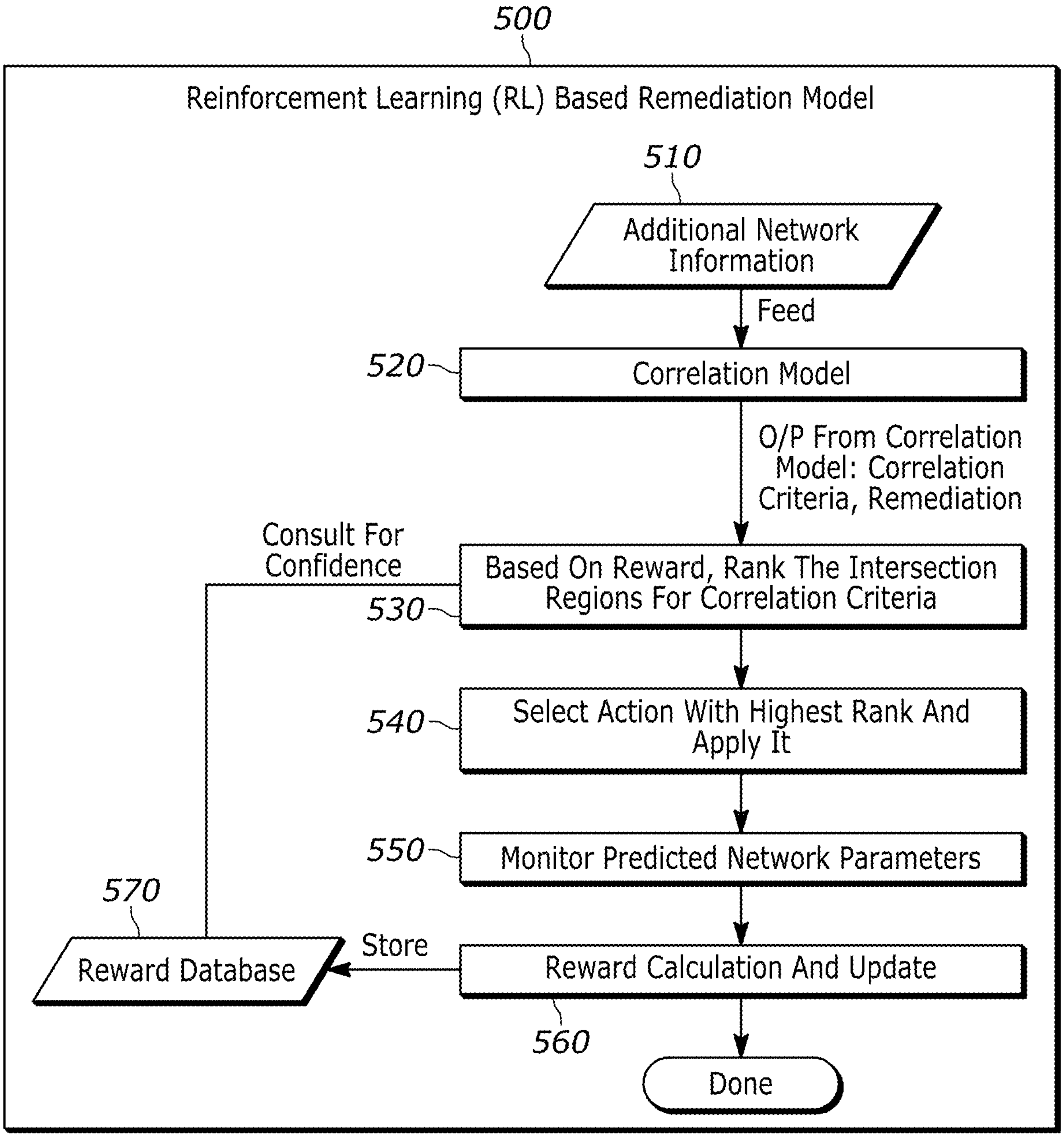
FIG. 5 illustrates operations of a reinforcement learning (RL) based remediation model in accordance with one embodiment.

FIG. 5 illustrates operations of a reinforcement learning (RL) based remediation model in accordance with one embodiment. The operations of the method 500 can be performed by a processing resource of a network security platform, a network security appliance/device including a network gateway, a VPN appliance/gateway, a network device, or UTM appliance (e.g., the FORTIGATE family of network security appliances, FortiAIOps network security appliances).

A reinforcement learning (RL) based approach selects a remediation action for a correlation criteria that can produce maximum or optimal reward (in terms of network remediation result). Reinforcement learning (RL) is an online machine learning technique for a system defined by a set of states, a set of possible actions, a set of rules relating state-transitions to actions, and immediate and long-term cumulative rewards. RL offers a computationally feasible approach to maximizing rewards over long-term horizons in systems with a very large number of parameters. During system operation, a RL agent or learner dynamically learns the cumulative reward, also termed Q-values associated with each state, and learns how to act in each state (i.e., which of the possible actions to take) in order to maximize cumulative reward.

At operation 510, the computer-implemented method includes obtaining additional network information (e.g., client density, dual band client ratio, etc., network parameters defined in Problem Detection) and inputting this additional network information into a correlation model.

At operation 520, the computer-implemented method implements the correlation model to generate correlation criteria and remediation actions. A supervised ML model is developed for correlation to identify the cause of the network problem(s) and possible remediation, from network parameters and network information.

At operation 530 for the RL based remediation model, the computer-implemented method includes ranking intersection regions (e.g., r1-r25 of FIGS. 4A-4F) for correlation criteria based on rewards. Initially, all remediation actions have equal reward and the remediation model can choose to use the same remediation given by the correlation model. The computer-implement method can consult a remediation matrix to determine actions available for predicted correlation criteria. A rewards database 570 provides a confidence of intersection regions.

At operation 540, the computer-implemented method includes selecting a remediation action with a highest rank and applying the remediation action to the network. At operation 550, the computer-implemented method includes monitoring predicted network parameters over time. At operation 560, the computer-implemented method includes determining a reward calculation and updating the reward based on the reward calculation in the reward database 570.

Figure 6:
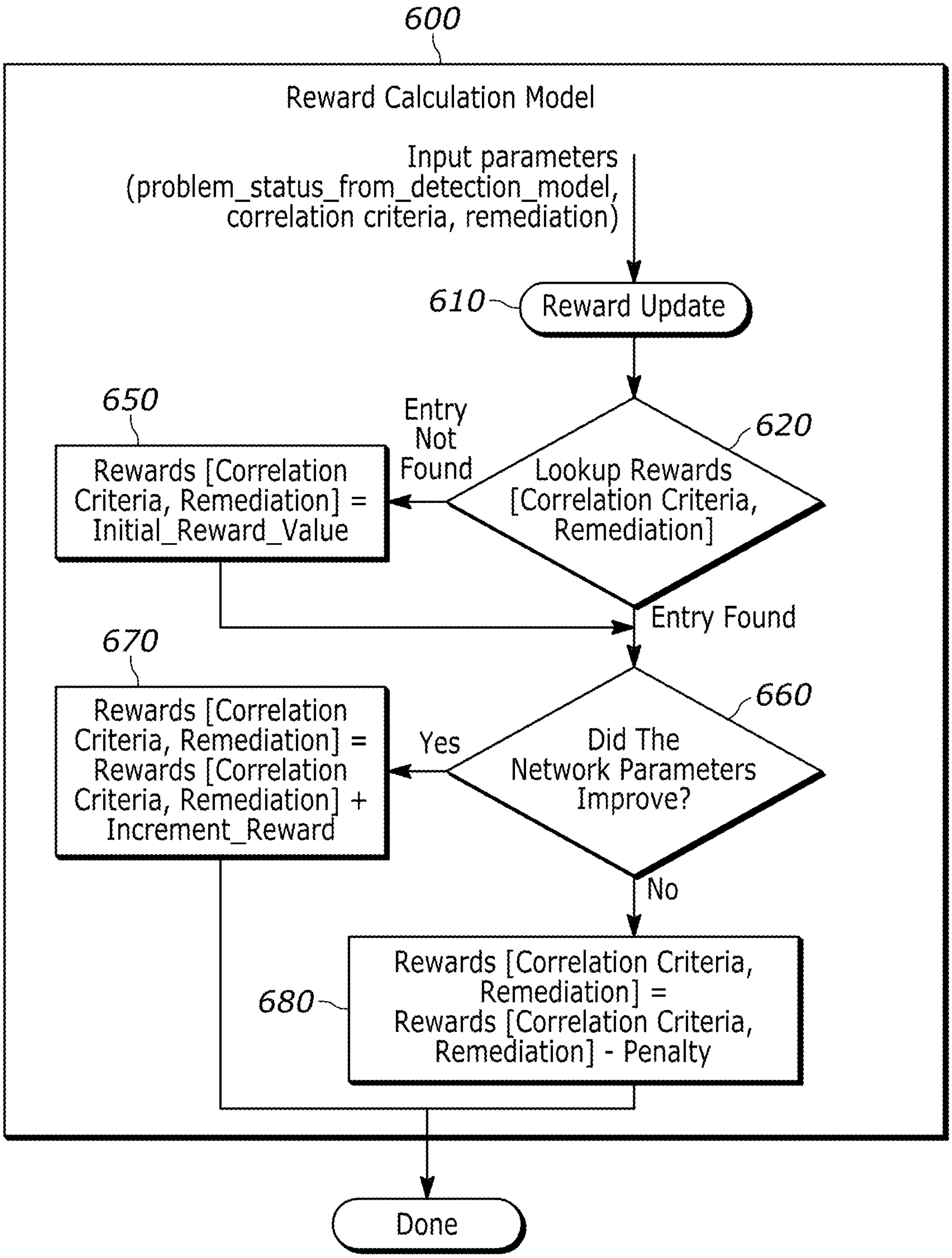
FIG. 6 illustrates operations of a computer implemented method for a reward calculation model in accordance with one embodiment.

FIG. 6 illustrates operations of a computer implemented method for a reward calculation model in accordance with one embodiment. The operations of the method 600 can be performed by a processing resource of a network security platform, a network security appliance/device including a network gateway, a VPN appliance/gateway, a network device, or UTM appliance (e.g., the FORTIGATE family of network security appliances, FortiAIOps network security appliances).

At operation 610, the computer-implemented method includes performing a reward initialization or update based on input parameters including problem status from a problem detection model, correlation criteria, and remediation actions.

At operation 620, the computer-implemented method includes performing a look up for each Reward and associated correlation criteria and remediation in a rewards database. In one example if a reward entry is not found in the rewards database, then rewards[correlation criteria, remediation] is set equal to initial_reward_value (if lookup fails) at operation 650.

At operation 660 after an entry is found at operation 620 or an initial reward value is established at operation 650, then the computer-implemented method includes determining if network parameters (e.g., AP parameters, client device parameters, network parameters identified in problem detection, etc.) improved based on an applied remediation action. If the applied remediation has helped in addressing an identified root cause and improving the correlation criteria, then at operation 670 the method increments a current reward value for a positive impact to the network. In one example, Rewards[correlation criteria, remediation]=Rewards[correlation criteria, remediation]+increment_reward.

Otherwise, if a remediation has negatively impacted the network, then decrease the existing reward at operation 680. In one example, Rewards[correlation criteria, remediation]=Rewards[correlation criteria, remediation]−penalty.

Figure 7:
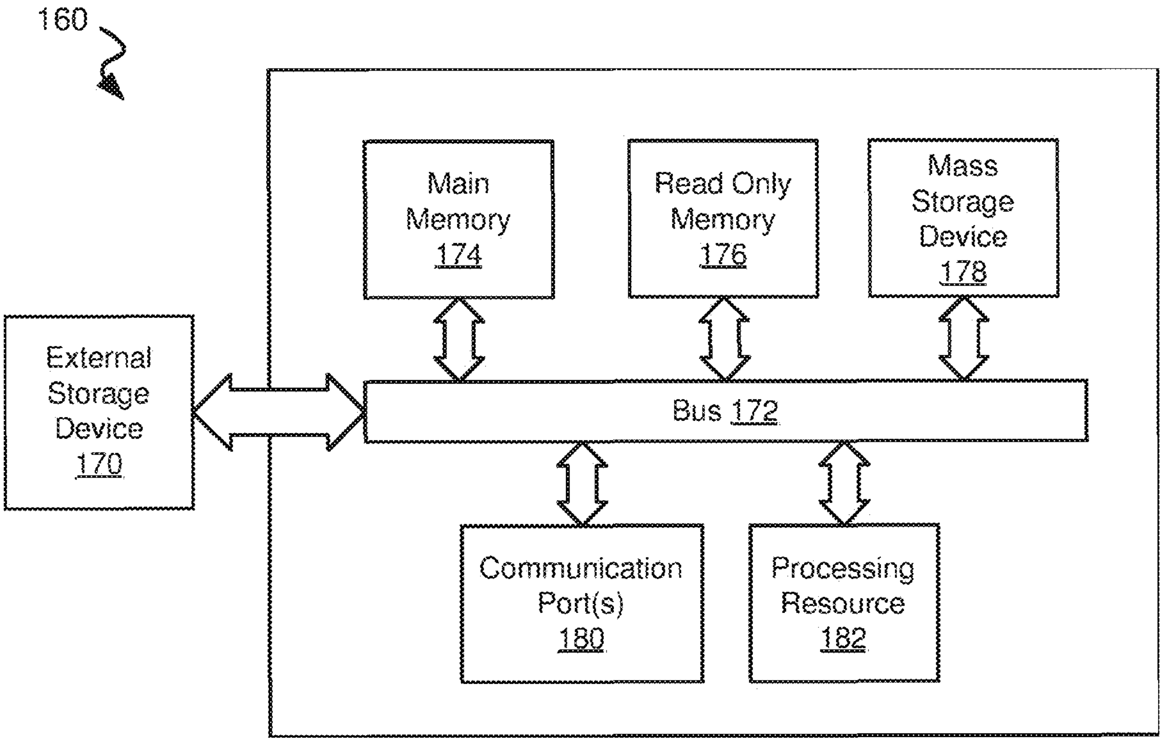
FIG. 7 illustrates an example computer system 160 in which or with which embodiments may be utilized.

Turning to FIG. 7, an example computer system 160 is shown in which or with which embodiments may be utilized. As shown in FIG. 7, computer system 160 includes an external storage device 170, a bus 172, a main memory 174, a read-only memory 176, a mass storage device 178 having non-transitory computer readable medium, one or more communication ports 180, and one or more processing resources (e.g., processing circuitry 182). In one embodiment, computer system 160 may represent some portion of a network element and/or network security appliance.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage device 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

In conclusion, the present design provides for novel systems and methods for network monitoring of a network using supervised machine learning and reinforcement learning. While detailed descriptions of one or more embodiments of the present design have been given above, various alternatives, modifications, and equivalents will be apparent to those skilled in the art without varying from the spirit of the present design. Therefore, the above description should not be taken as limiting the scope of the present design, which is defined by the appended claims.

What is claimed is:

1. A computer-implemented method, comprising:

identifying features including access point (AP) parameters and client device parameters that indicate a network health of a network of one or more access points (AP) and client devices;

performing, with one or more processing resources of a network appliance, feature goodness classification (FGC) to classify each identified feature independently with feature weights being based on an importance of a feature for impacting a cumulative score and the network health;

computing, with the one or more processing resources of the network appliance, cumulative scores periodically as a weighted sum of normalized values of each feature including access point (AP) parameters and client device parameters;

determining if a network problem is identified based on the cumulative scores; and implementing a correlation model with supervised machine learning to determine correlation criteria based on implicit relationships between various different network parameters and remediation actions based on features contributing to an identified network problem.

2. The computer-implemented method of claim 1, further comprising:

inputting values of the periodically computed cumulative scores to a moving exponential average model, wherein the network problem is identified when the moving exponential average of the computed cumulative scores exceeds a benchmark consistently for a fixed number of monitor intervals;

applying a remediation action to the network based on the identified problem when the moving exponential average of the computed cumulative scores exceeds a benchmark consistently for a fixed number of monitor intervals;

implementing a reinforcement learning (RL) based remediation model to rank intersection regions for correlation criteria based on rewards; and initially setting remediation actions to an equal reward.

3. The computer-implemented method of claim 2, further comprising:

consulting a remediation matrix to determine remediation actions available for the correlation criteria; and selecting a remediation action with a highest rank.

4. The computer-implemented method of claim 1, further comprising:

monitoring network parameters over time; and determining a reward calculation and updating a reward based on a reward calculation.

5. The computer-implemented method of claim 1, wherein the AP parameters comprise channel utilization, transmit retries if an AP does not receive acknowledgement of a transmitted data frame, data frame discards, noise level, or CPU stats.

6. The computer-implemented method of claim 1, wherein the client device parameters comprise receive signal strength indicator (RSSI), retries, discards, or noise level.

7. A system comprising:

one or more processing resources of one or more network appliances; and a non-transitory computer readable medium coupled to the one or more processing resources and having stored therein instructions being executable by the one or more processing resources cause the one or more processing resources to:

identify features including access point (AP) parameters and client parameters that indicate a network health of a network of one or more access points (AP) and client devices;

performing feature goodness classification (FGC) to classify each identified feature independently with feature weights being based on an importance of a feature for impacting a cumulative score and the network health;

compute cumulative scores periodically as a weighted sum of normalized values of each feature including access point (AP) parameters and client device parameters;

determine if a network problem is identified based on the cumulative scores; and implement a correlation model with supervised machine learning to determine correlation criteria based on implicit relationships between various different network parameters and remediation actions based on features contributing to an identified network problem.

8. The system of claim 7, wherein the instructions being executable by the one or more processing resources cause the one or more processing resource to:

implement a reinforcement learning (RL) based remediation model to rank intersection regions for correlation criteria based on rewards; and initially set remediation actions to an equal reward.

9. The system of claim 8, wherein the instructions being executable by the one or more processing resources cause the one or more processing resources to:

consult a remediation matrix to determine remediation actions available for the correlation criteria; and select a remediation action with a highest rank.

10. The system of claim 9, wherein the instructions being executable by the one or more processing resources cause the one or more processing resource to:

apply the selected remediation action to the network.

11. The system of claim 10, wherein the instructions being executable by the one or more processing resources cause the one or more processing resource to:

monitor predicted network parameters over time; and determine a reward calculation and updating a reward based on a reward calculation.

12. The system of claim 7, wherein the AP parameters comprise channel utilization, transmit retries if an AP does not receive acknowledgement of a transmitted data frame, data frame discards, noise level, or CPU stats.

13. The system of claim 7, wherein the client parameters comprise RSSI, retries, discards, or noise level.

14. A non-transitory computer readable medium having stored therein instructions being executable by one or more processing resources of one or more network appliances cause the one or more processing resources to:

implement a correlation model with supervised machine learning to determine correlation criteria based on implicit relationships between various different network parameters and remediation actions based on features contributing to an identified network problem of a network having one or more access points and client devices;

receive, with a reinforcement learning (RL) based remediation model, correlation criteria and remediation actions; and rank intersection regions of different network parameters for correlation criteria including two or more of network interference between dual band client ratio, neighbor access point count, or channel utilization, load balancing for neighbor access points due to high utilization, client density, or retries, radio frequency (RF) coverage between client receive signal strength indicator (RSSI), noise, and retries, anomalies for a wired network, and service level agreement breaches; and apply a selected remediation action for a correlation criteria to produce an optimal reward in terms of network remediation result for the network.

15. The non-transitory computer readable medium of claim 14, wherein the instructions being executable by the one or more processing resources cause the one or more processing resources to:

initially set remediation actions to an equal reward or update rewards based on input parameters including problem status from a problem detection model, correlation criteria, and remediation actions.

16. The non-transitory computer readable medium of claim 15, wherein the instructions being executable by the one or more processing resources cause the one or more processing resources to:

consult a remediation matrix to determine remediation actions available for the correlation criteria; and select a remediation action with a highest rank.

17. The non-transitory computer readable medium of claim 14, wherein the instructions being executable by the one or more processing resources cause the one or more processing resources to:

monitor network parameters over time; and determine a reward calculation and updating a reward based on a reward calculation.

18. The non-transitory computer readable medium of claim 17, wherein the instructions being executable by the one or more processing resources cause the one or more processing resources to:

determine the reward calculation by incrementing a reward if the applied remediation positively impacted the network.

* * * * *